United States Patent
Kumberger et al.

(10) Patent No.: US 6,521,197 B1
(45) Date of Patent: Feb. 18, 2003

(54) CATALYTICAL PROCESS OF METHANOL REFORMATION

(75) Inventors: Otto Kumberger, Mannheim (DE); Otto Hofstadt, Altrip (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/616,950

(22) Filed: Jul. 14, 2000

Related U.S. Application Data

(62) Division of application No. 09/146,198, filed on Sep. 3, 1998, now abandoned.

(30) Foreign Application Priority Data

Sep. 10, 1997 (DE) .......................................... 197 39 746

(51) Int. Cl.$^7$ .............................. C01B 31/20; C01B 3/02
(52) U.S. Cl. ................ 423/437.1; 252/373; 423/648.1; 502/340; 502/345; 502/349; 502/355
(58) Field of Search .............................. 423/648.1, 651, 423/652, 655, 656, 437.1; 585/250, 275; 252/373; 502/340, 345, 349, 355

(56) References Cited

U.S. PATENT DOCUMENTS

| | | | | |
|---|---|---|---|---|
| 3,898,180 A | * | 8/1975 | Crooks et al. ............... | 252/449 |
| 3,923,695 A | * | 12/1975 | Weissel et al. .............. | 252/465 |
| 3,924,996 A | * | 12/1975 | Tatis et al. ............... | 425/348 R |
| 4,046,869 A | * | 9/1977 | Dorawala et al. ............ | 423/652 |
| 4,283,581 A | | 8/1981 | Wilkes ........................ | 568/864 |
| 4,613,584 A | * | 9/1986 | Schneider et al. ........... | 502/304 |
| 4,780,300 A | * | 10/1988 | Yokoyama et al. .......... | 423/415 |
| 4,797,287 A | | 1/1989 | Pich et al. .................. | 424/464 |
| 4,828,843 A | | 5/1989 | Pich et al. .................. | 424/480 |
| 5,112,591 A | | 5/1992 | Chaumette et al. ......... | 423/415 |
| 5,656,249 A | | 8/1997 | Yoshida et al. .............. | 423/239 |

FOREIGN PATENT DOCUMENTS

| | | |
|---|---|---|
| DE | 19 505 347 | 3/1994 |
| EP | 152 314 | 1/1984 |
| EP | 277 843 | 8/1988 |

OTHER PUBLICATIONS

Chemical Abstracts vol. 72, No. 11526r (1970).
Catalyst Handbook, $2^{nd}$ Ed., pp 44–48 (1983).

* cited by examiner

*Primary Examiner*—Stanley S. Silverman
*Assistant Examiner*—Maribel Medina
(74) *Attorney, Agent, or Firm*—Keil & Weinkauf

(57) ABSTRACT

This invention relates to an improved process of producing hydrogen and carbon dioxide by the catalytical process of methanol reformation. The improvement resides in the use of catalysts made up substantially of metal oxides selected from the group consisting of $Al_2O_3$, $TiO_2$, $ZrO_2$ and $ZnO$, and which catalyst is in the form of a substantially cylindrical tablet having a maximum diameter in the range from 0.8 to 2.0 mm and a maximum height in the range of from 0.5 to 2.0 mm.

10 Claims, No Drawings

CATALYTICAL PROCESS OF METHANOL REFORMATION

CROSS-REFERENCE TO RELATED APPLICATIONS

This is a Divisional Application of application Ser. No. 09/146,198, filed Sep. 03, 1998 (abandoned).

The invention relates to catalysts in tablet form.

BACKGROUND OF THE INVENTION

Solid catalysts can be used in industrial processes in the form of powders, granules, chips or shaped bodies. Three main processes are employed here for shaping: tableting, extrusion and granulation. These processes are reviewed in Catalyst Handbook, 2nd edition, edited by Martyn V. Twigg, Wolfe Publishing Ltd., 1989, pages 44 to 48.

Extrudates generally have long irregular cylindrical shapes, the length being restricted by naturally occurring fractures (for example extrusion presses). In addition to circular cross sections, star-shaped cross sections, for example, can also be produced in order to increase the external surface area. The extrudates have a lower density than tablets. Suitable sizes are diameters of about 1 mm or above. Hollow extrudates can also be produced.

Granules (grains) have a spherical shape. They are less dense than tablets and have a diameter of about 2 mm or more.

Tablets generally have a cylindrical shape, customary sizes being in the range from 5 mm to about 20 mm. Both cylinders and Raschig rings can be produced, with other shapes being possible to a limited extent.

Frequently, two compacting steps are required in shaping. The tablets are denser and stronger than extrudates or granules.

Suitable production processes and corresponding apparatuses are known for the individual catalyst shapes. In the abovementioned Catalyst Handbook it is stated that smaller particles are preferably produced by granulation or extrusion and not by tableting. The choice between extrusion and granulation accordingly principally depends on the type of the powder precursor.

For many catalyst applications, in particular in mobile systems, a high packing density of the catalyst in the catalyst bed is important, in order to ensure compact construction. In particular in the case of mobile systems for methanol reformation, in which methanol and steam produce hydrogen and carbon dioxide which are necessary for operating fuel cells, a high packing density or bulk density of the reformation catalyst is sought after. Catalysts which are suitable for this application are in particular particles made up of CuO, ZnO and $Al_2O_3$. Frequently, use is made of catalyst chips, which are obtained by comminuting catalyst tablets. By using catalyst chips, a high bulk density can be achieved, but the mechanical stability of the catalyst material is impaired, so that during operation, abrasion and pulverization and thus mechanical breakdown of the catalyst occur. In addition, there is a significantly higher pressure drop on beds of irregularly shaped chip particles than with beds of regularly shaped tablets.

EP-A-0 152 314 describes this catalyst chips of such a type having a particle diameter of less than 0.5 mm.

SUMMARY OF THE INVENTION

It is an object of the present invention to provide catalyst particles which permit a high bulk density and simultaneously have high mechanical stability. The catalysts are to be useable, in particular, for the steam reformation of methanol.

DETAILED DESCRIPTION OF THE INVENTION

We have found that this object is achieved according to the invention by catalysts in tablet form having a maximum diameter of at most 2 mm and a maximum height of at most 2 mm.

It has been found that catalyst tablets can also be produced even in a maximum diameter of at most 2 mm and a maximum height of at most 2 mm. Catalyst tablets of this type have outstanding mechanical properties and are mechanically stable without disintegrating, even under high load for a long period. They are thus suitable, in particular, for applications in which a high bulk density of the catalyst is important, for example in mobile applications. Owing to the high mechanical stability, the catalysts withstand high mechanical loads.

For the purposes of the present invention, the term "catalyst" also includes catalyst supports to which catalytically active substances must still be applied prior to use (for example by impregnation). This can include, for example, applying metals or metal oxides, and also metal salts or other metal compounds. However, preferably, the tableted catalyst can be used directly in catalysis. The expression "maximum diameter", in the case of a tableted catalyst which is not cylindrical, describes the diameter at which the two corresponding peripheral points have the maximum distance from the center. In the case of an elliptical shape, this is, for example, the greater of the two diameters. In the case of a cylindrical tablet shape (ie. circular cross section) there is only one diameter, which thus corresponds to the maximum diameter. The same applies to the term "maximum height". In the case of a tablet having an irregular surface, it denotes the maximum height in this irregular shape. In the case of a cylindrical tablet, the maximum height corresponds precisely to the height of the cylinder. The height of the tablet is measured along the direction of compaction during tablet production. The diameter is determined in the plane perpendicular thereto.

The tablets can have any suitable shape. Generally, they are cylindrical or have an elliptical shape in the above indicated plane. Preferably, the tablets have a cylindrical shape. The tablets can also have a dish shape, for example. Other tablet shapes are circular or oval disks (pellets, pastilles), blocks or spheres, and also spherical sections.

Preferably, the tablets according to the invention have a minimum diameter of 0.8 mm, preferably 1.0 mm and a minimum height of 0.5 mm, preferably 0.8 mm. Preferably, the maximum diameter is in the range from 0.8 to 2.0 mm, preferably from 1.0 to 1.8 mm or less than 1.8 mm, in particular at most 1.5 mm, and the maximum height is from 0.5 to 2.0 mm, preferably from 0.8 to 1.8 mm or less than 1.8 mm, in particular at most 1.5 mm.

The weight of a tablet depends on the material used and the degree of densification. Preferably, the weight of one tablet is from 2 to 20 mg, particularly preferably from 4 to 10 mg.

The catalyst in tablet form can be made up of any catalyst materials which may be brought into tablet form. Preferably, in addition to binders, lubricants and other processing aids, the catalyst is essentially made up of metal oxides. The metal oxides can also be mixed with small amounts of active metals. Examples of suitable metal oxides are metal oxides of elements of groups IA, IIA, IIIA, IVA, VA, IIIB–VIIIB, IB, IIB, preferably groups IIA, IIIA, IVB, VB, VIB, VIIB, VIIIB, IB, IIB, in particular $Al_2O_3$, $TiO_2$, $ZrO_2$, CuO, ZnO, of the Periodic Table of the Elements. Particular preference is given to catalysts which are essentially made up of CuO, ZnO and $Al_2O_3$, for example of about 67% by weight of CuO, 26.4% by weight of ZnO and 6.6% by weight of $Al_2O_3$.

The metal oxides in this case can be produced by any suitable preparation process, for example by precipitating dissolved metal compounds and drying or calcining the precipitation products.

The tablets according to the invention are preferably solid tablets.

The invention also relates to a process for producing these tablets by tableting a powder or granules of the corresponding catalyst material.

Preferably, for tableting, use is made of precompacted material having a mean particle size of from 0.01 to 1.0 mm, particularly preferably from 0.05 to 0.6 mm. Advantageously, use can also be made of precompacted particles or granules having a content of generally from 0.1 to 50% by weight, preferably from 5 to 50% by weight, especially from 10 to 40% by weight, of a mean particle size in the range from 0.01 to 0.4 mm, especially from 0.05 to 0.3 mm, and having a content of generally from 20 to 95% by weight, preferably from 50 to 95% by weight, especially from 60 to 90% by weight, of a mean particle size in the range from 0.2 to 1.0 mm, especially from 0.3 to 0.8 mm.

Generally, the particle size should be selected in such a manner that the powder or granules can be readily metered and the particle size is significantly below the dimensions of the tablet to be produced. Preferably, the particles used should have a mean particle diameter which corresponds to at most 50% of the maximum diameter or the maximum height.

The tablets can be produced, for example, in known tableting machines in eccentric or rotary tableting presses; the tableting tools must be designed for the required tablet size.

The tablets according to the invention, in comparison with the known large tablets, have a substantially better packing behavior and, in comparison with the known catalyst chips, have substantially improved mechanical properties (hardness, abrasion, dust discharge) and decreased pressure drop for the same or similar bulk density. The catalysts according to the invention, for the same active mass, have especially at least the same initial activity, based on the volume, as chip fractions of the same material.

Catalysts in tablet form having the small dimensions according to the invention can be used in a multiplicity of applications. Examples are, in addition to methanol reformation, the hydrogenation of esters, carboxylic acids, aldehydes, ketones or nitriles, the reformation of hydrocarbons (in particular for mobile applications) and the shift reaction of CO with steam, (in particular in the case of mobile applications). Generally, the catalysts in tablet form according to the invention are particularly advantageously used in reactions limited by mass transport.

Some catalysts are treated before use under reducing conditions, at least a portion of the metal oxides being converted into metals. For example, when the catalyst of CuO, ZnO and $Al_2O_3$ is used in a methanol reformation reactor, the copper oxide in the catalyst is at least partially converted into metallic copper. The hardness advantages of the small catalyst tablets in comparison with chips are particularly pronounced in the reduced or partially reduced state.

The examples below illustrate the invention.

EXAMPLE 1

Production of Tablets of Diameter 1.5 mm and Height 1.5 mm from Cu—Zn—Al Oxide Active Composition The starting material for producing tablets of diameter 1.5 mm and height 1.5 mm was an active composition of 67% by weight of CuO, 26.4% by weight of ZnO, 6.6% by weight of $Al_2O_3$, which have been produced by precipitating the components, washing the precipitation product (free of sodium and nitrate), spray-drying and calcining the product at 400° C. This pulverulent starting material was compacted and then comminuted again using a laboratory roller mill (Bauermeister LRC 250). The particle size fraction of 0.3–0.63 mm was screened out of the resulting ground material using a vibratory tumbling screen. In addition, the sieve fraction smaller than 0.3 mm was separated off.

A Kilian LX 18 rotary tableting press was used for tableting. The tableting mixture consisted of the sieve fractions produced in the manner described above, 75% by weight being granules of the particle size fraction from 0.03 to 0.3 mm and 25% by weight granules of the particle size fraction smaller than 0.3 mm. 2% by weight of graphite was added to this product mixture and the material was mixed in a Lödige mixer for 2 min. The resulting product was the starting material for tableting.

Tableting was performed at the following settings:

Depth of fill: 1.8–2.0 mm;

Installed cam track: 0–4.5 mm;

Prepressure: 0.5 kN;

Main pressure: 10.4 kN (maximum value);

Turntable revolutions: 34 rpm;

Table speed: 0.479 m/sec.

A tableting tool specially made for this tableting operation was used; it consisted of a matrix having 9 bores (bore diameter 1.5 mm), a perforated plate for the lower punch shank, a perforated plate for the upper punch shank and 9 upper and 9 lower dies. The tableting machine was fitted with 6 tools (each comprising 1 matrix, 2 perforated plates, 9 upper punches, 9 lower punches) and tableting was carried out at the above-described settings. In the tableting operation, on average, an ejection force of 0.7 kN was measured for the small tablets.

Tablets are produced having a diameter of 1.5 mm and a height of 1.5 mm. The tablets have a BET surface area of 60 $m^2/g$ and a mean pore volume of 0.15 ml/g. The lateral crushing resistance of the tablets in the oxidic state is 24.3 N/tablet (standard deviation: 9.2 N/tablet; determined using a Frank hardness tester on 20 tablets), the end crushing resistance is 979 $N/cm^2$ (standard deviation: 312 $N/cm^2$; determined on the same instrument). The bulk density of the tablets is 1.654 kg/l.

EXAMPLE 2

Production of Tablets of Diameter 1.5 mm and Height 1.25 mm from Cu—Zn—Al Oxide Active Composition The starting material for the tableting was produced as described in Example 1.

Tableting was performed at the following settings:

Depth of fill: 1.6 mm;

Installed cam track: 0–4.5 mm;

Prepressure: 0.5 kN;

Main pressure: 10.5 kN (maximum value);

Turntable revolutions: 34 rpm;

Table speed: 0.479 m/sec.

A tableting tool specially made for this tableting operation was used; it consisted of a matrix having 9 bores (bore diameter 1.5 mm), a perforated plate for the lower punch shank, a perforated plate for the upper punch shank and 9 upper and 9 lower dies. The tableting machine was fitted with 6 tools (each comprising 1 matrix, 2 perforated plates, 9 upper punches, 9 lower punches) and tableting was carried out at the above-described settings. In the tableting operation, on average, an ejection force of 0.75 kN was measured for the small tablets.

Tablets having a diameter of 1.5 mm and a height of 1.25 mm are produced. The tablets have a BET surface area of 60 $m^2/g$ and a mean pore volume of 0.13 ml/g. The lateral crushing resistance of the tablets in the oxidic state is 23.7 N/tablet (determined using a Frank hardness tester on 20 tablets). The bulk density of the tablets is 1.83 kg/l.

Catalyst Test

The catalyst of Example 1 was tested in a differential circulation tests reactor. 10 ml of the tableted catalyst, diluted in 40 ml of inert material (steatite spheres) were placed in the test reactor (dimensions of the catalyst bed (including inert material): height approximately 18 mm; diameter approximately 60 mm). The catalyst was reduced with hydrogen to gas (1% $H_2$ in $N_2$) at 200° C. The catalyst then received a stream of the steam/methanol mixture (250 ml/h mixture; molar ratio: 1.5 mol $H_2O$:1 mol MeOH) (pressure: 3 bar absolute). The steam/methanol mixture was evaporated in a preliminary evaporator and then passed over the catalyst. The catalyst test was carried out at a reactor temperature of 280° C. over a period of 4 hours. The feed of the steam/methanol starting material mixture was then shut off, the reactor was purged with nitrogen for 30 minutes and then the reactor heating was shut off. After cooling the reactor to room temperature, 2% by volume of air was added to the nitrogen stream. After 30 minutes, the nitrogen stream was shut off and undiluted air was passed over the catalyst for 30 minutes. The catalyst was then taken out of the reactor and the lateral crushing resistance of the tablets was determined. After this treatment, the catalyst still had very good lateral crushing resistance of 7.5 N/tablet (standard deviation: 2.1 N/tablet). None of the tested tablets had visible damage; none of the tablets had disintegrated.

We claim:

1. In the process of producing hydrogen and carbon dioxide by the catalytical process of methanol reformation, the improvement consisting of employing a catalyst substantially made up of metal oxides from the group consisting of $Al_2O_3$, $TiO_2$, $ZrO_2$, CuO and ZnO, and which catalyst is in the form of a substantially cylindrical tablet having a maximum diameter in the range from 0.8 to 2.0 mm and a maximum height in the range of from 0.5 to 2.0 mm and wherein water is present in stoichiometric excess to methanol.

2. The process according to claim 1, wherein the said catalyst tablet is from 2 to 20 mg.

3. The process according to claim 1, wherein the said catalyst additionally contains binders and lubricants.

4. The process according to claim 1, wherein the said metal oxides are mixed with small amounts of active metals.

5. The process according to claim 1, wherein the said catalyst is substantially made up of CuO, ZnO and $Al_2O_3$.

6. The process according to claim 1, wherein the copper oxide is at least partially converted into metallic copper before use.

7. The process according to claim 1, wherein the process is carried out in a mobile system for methanol reformation.

8. The process according to claim 1, wherein the said catalyst is prepared by tableting a powder or granules of the corresponding catalyst material.

9. The process according to claim 1, wherein there is made use of granules having a content of from 0.1 to 50% by weight of the mean particle size of from 0.01 to 0.4 mm and having a content of from 20 to 95% by weight of a mean particle size of from 0.2 to 1.0 mm.

10. The process according to claim 1, wherein eccentric or rotary tableting presses are used to produce the tablets.

* * * * *